US008407230B2

(12) United States Patent
Slaney et al.

(10) Patent No.: US 8,407,230 B2
(45) Date of Patent: Mar. 26, 2013

(54) SYSTEM AND METHOD FOR IDENTIFYING SIMILAR MEDIA OBJECTS

(75) Inventors: Malcolm Slaney, Santa Clara, CA (US); William White, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 645 days.

(21) Appl. No.: 11/842,899

(22) Filed: Aug. 21, 2007

(65) Prior Publication Data
US 2009/0049082 A1 Feb. 19, 2009

Related U.S. Application Data

(63) Continuation-in-part of application No. 11/838,003, filed on Aug. 13, 2007, now Pat. No. 7,849,092.

(51) Int. Cl.
G06F 7/00 (2006.01)
G06F 17/30 (2006.01)
G06F 17/00 (2006.01)

(52) U.S. Cl. ......... 707/748; 707/751; 707/758; 707/916

(58) Field of Classification Search .......... 707/999.001–999.005, 736, 748
See application file for complete search history.

(56) References Cited

U.S. PATENT DOCUMENTS

| | | | |
|---|---|---|---|
| 7,720,723 B2 * | 5/2010 | Dicker et al. | 705/26.8 |
| 2001/0013009 A1 * | 8/2001 | Greening et al. | 705/10 |
| 2002/0082901 A1 | 6/2002 | Dunning et al. | |
| 2003/0105682 A1 * | 6/2003 | Dicker et al. | 705/27 |
| 2005/0125307 A1 * | 6/2005 | Hunt et al. | 705/26 |
| 2006/0265421 A1 | 11/2006 | Ranasinghe et al. | |
| 2007/0088727 A1 | 4/2007 | Kindig | |
| 2007/0089057 A1 | 4/2007 | Kindig | |
| 2008/0066099 A1 * | 3/2008 | Brodersen et al. | 725/35 |
| 2008/0071602 A1 * | 3/2008 | Ojakaar et al. | 705/10 |
| 2008/0120288 A1 * | 5/2008 | Guan et al. | 707/5 |
| 2008/0306935 A1 * | 12/2008 | Richardson et al. | 707/5 |
| 2009/0077052 A1 * | 3/2009 | Farrelly | 707/5 |

OTHER PUBLICATIONS

Bradley et al. "Improving Recommendation Diversity" In D. O'Donoghue, editor, Proceedings of the Twelfth National Conference in Artificial Intelligence and Cognitive Science (AICS-01), Maynooth, Ireland, pp. 75-84, 2001.
Chang et al. "LIBSVM—A Library for Support Vector Machines" http://www.csie.ntu.edu.tw/~cjlin/libsvm/ Sep. 2, 2006.
J. Stephen Downie "The Music Information Retrieval Evaluation eXchange (MIREX)", D-Lib Magazine, 12 (Issue 12), 2006.
Duchene et al. "An Optimal Transformation for Disciminant and Principal Component Analysis" IEEE Transactions on Pattern Analysis and Machine Intelligence vol. 10, No. 6, Nov. 1988.
Flickner et al. Query by Image and Video Content: The QBIC System: Computer, 28(9), pp. 21-32, 1995.

(Continued)

Primary Examiner — Jacob F Bétit
Assistant Examiner — Kannan Shanmugasundaram
(74) Attorney, Agent, or Firm — Berkeley Law & Technology Group, LLP

(57) ABSTRACT

The systems and methods described create a mathematical representation of each of the media objects for which user ratings are known. The mathematical representations take into account the subjective rating value assigned by a user to the respective media object and the user that assigned the rating value. The media object with the mathematical representation closest to that of the seed media object is then selected as the most similar media object to the seed media object. In an embodiment, the mathematical representation is a vector representation in which each user is a different dimension and each user's rating value is the magnitude of the vector in that dimension. Similarity between two songs is determined by identifying the closest vectors to that of the seed song. Closeness may be determined by subtracting or by calculating the dot product of each of the vectors with that of the seed media object.

30 Claims, 5 Drawing Sheets

OTHER PUBLICATIONS

Hofmann et al. "Latent Class Models for Collaborative Filtering" IJ-CAI '99: *Proceedings of the Sixteenth International Joint Conference on Artificial Intelligence*, San Francisco, CA, USA, pp. 688-693, 1999.

Kleinberg et al. "Using Mixture Models for Collaborative Filtering" Annual ACM Symposium on Theory of Computing archive Proceedings of the thirty-sixth annual ACM symposium on Theory of computing table of contents Chicago, IL, USA, 2004, pp. 569-578.

Logan et al. "Toward Evaluation Techniques for Music Similarity" Published in and Presented at SIGIR 2003: Workshop on the Evaluation of Music Information Retrieval Systems, Aug. 1, 2003, Toronto, Canada.

Logan et al. "Music Summarization Using Key Phrases" International Conference on Acoustics, Speech, and Signal Processing, 2000. Jun. 5-9, 2000, Publication Date: 2000, vol. 2, on pp. II749-II752 vol. 2; Location: Istanbul, Turkey.

Marlin et al. "Collaborative Filtering and the Missing at Random Assumption" Submitted to *Proceedings of the The 23$^{rd}$ Conference on Uncertainty in Artificial Intelligence*. 2007.

Pampalk et al. "Improvements of Audio-Based Music Similarity and Genre Classification" in Proceedings of the Sixth International Conference on Music Information Retrieval (ISMIR) 2005.

Pennock et al. Collaborative filtering by personality diagnosis: A hybrid memory- and model-based approach, in *Proceedings of the 16$^{th}$ Conference on Uncertainty in Artificial Intelligence (UAI-2000)*, pp. 473-480, Stanford, CA , Jun. 2000.

Platt et al. "Learning a Gaussian Process Prior for Automatically Generating Music Playlists" Advances in Neural Information Processing Systems, 2002—research.microsoft.com.

Resnick et al. "GroupLens: An Open Architecture for Collaborative Filtering of Netnews." In *Proceedings of ACM 1994 Conference on Computer Supported Cooperative Work*, pp. 175186, Chapel Hill, North Carolina, 1994. ACM.

Sarwar et al. "Item-based collaborative filtering recommendation algorithms." In *Proc. of the 10$^{th}$ International World Wide Web Conference (WWW10)*, Hong Kon, May 2001.

Slaney et al. "Similarity Based on Rating Data", Austrian Computer Society (OCG) 2007.

Slaney et al. Measuring playlist diversity for recommendation systems. In *Proceedings of the 1$^{st}$ ACM Workshop on Audio and Music Computing Multimedia*, Santa Barbara, California, USA, Oct. 27, 2006.

Tzanetakis, G. "Musical Genre Classification of Audio Signals" IEEE Transactions on Speech and Audio Processing, vol. 10, No. 5, Jul. 2002, 293-302.

Tzanetakis et al. Automatic Musical Genre Classification of Audio Signals, in *Proceedings International Symposium for Audio Information Retrieval (ISMIR)*, Oct. 2001.

Tzanetakis et al. "MARSYAS: A Framework for Audio Analysis" Organized Sound (1999), 4: 169-175 Cambridge University Press.

Zhai et al. "A Risk Minimization Framework for Information Retrieval" Information Processing and Management (IP&M), 42(1), Jan. 2006, pp. 31-35.

Ziegler et al. "Improving Recommendation Lists Through Topic Diversification" WWW 2005, May 10-14 2005, Chiba Japan.

* cited by examiner

SYSTEM AND METHOD FOR IDENTIFYING SIMILAR MEDIA OBJECTS

RELATED APPLICATIONS

This application is a Continuation-in-Part of pending prior application Ser. No. 11/838,003 filed Aug. 13, 2007, all of which is hereby incorporated by this reference.

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

There are many situations where it is useful to identify a media object or objects, e.g., songs, movies, plays, books etc., that are similar to another media object. Before electronic commerce, such determinations were made by people who had broad knowledge of the media available at the time. For example, the owner of a music or video store might recommend a particular item to a customer based on the owner's knowledge of the customer's tastes and the catalog of media. The value of the recommendation to the customer, however, was dependent on the owner's ability to accurately assess the customer's tastes as well as the owner's depth of knowledge of the available media.

With the emergence of digital media, users and those who recommend music are now faced with the problem of too much choice. There is simply more media available to the user now than they will ever be able to consume. Traditional media discovery methods such as searching for a track by artist, album or title are no longer sufficient. The user is restricted to what they already know, which is a constantly shrinking piece of an ever increasing media pie. Using genre as the primary discovery mechanism is also not sufficient as genre is often difficult to pin down, with two people often classifying the same piece of music into completely different genres.

One of the more popular mechanisms for facilitating media discovery is the personalized recommendation system. Such systems are typically based on a collaborative filtering approach, in which knowledge of a first user's tastes is recorded and compared to those of other users in order to find users with similar tastes. If a match is found, then songs liked by the matching user are recommended to the first user.

One drawback of this approach is that it is not useful unless there is sufficient knowledge of a user's tastes to begin making correlations to other users. This makes the approach unsuited to anonymous systems and, for best performance, requires significant amounts of information regarding a user's tastes to be collected first.

Existing recommendation systems also do not take into account the context of how the user is feeling at the moment. Users may have broad musical tastes, but what they want to hear at any point in time is highly influenced by their mood, or what they happen to be doing. Last week they may have been happily listening to hardcore metal, but yesterday they wanted nothing but upbeat dance music. Today it's raining and they're feeling mellow. Traditional recommendation engines end up averaging these disparate sets of music together.

SUMMARY

The systems and methods described herein create mathematical representations of media objects for which user ratings are known. The mathematical representations take into account the rating value assigned by a user to the respective media object and the user that assigned the rating value. In an embodiment, the mathematical representation is a vector representation in which each user is a different dimension and each user's rating value is the magnitude of the vector in that dimension. The media object with the mathematical representation closest to that of the seed media object is then selected as the most similar media object to the seed media object. In the vector representation embodiment, the most similar media object is one with the closest normalized vector to the normalized vector of the seed media object. The closest vector may be determined by subtracting or by calculating the dot product of each of the vectors with that of the seed media object.

In one aspect, the present disclosure may be considered to describe systems for identifying similar media objects. Such systems may include a communications module that receives a request for a media object similar to an identified seed media object and that transmits a response to the request. A datastore, such as a user database, is also provided that contains a plurality of user ratings of media objects, in which each user rating includes a user identifier, a rating value, and a media object identifier. The user ratings of media objects include user ratings of the seed object and user ratings of a plurality of first objects. In addition, such systems include a comparison engine that analyzes the plurality of user ratings for the various media objects and identifies, based on the plurality of user ratings, a first media object as similar to the seed media object.

Another aspect of the disclosure is a method of identifying similar media objects using subjective user ratings. The method includes receiving a request for a media object that is similar to an identified seed media object and creating a mathematical representation of the seed media object based on subjective user ratings of the seed media object. The mathematical representation of the seed media object is then compared to a plurality of mathematical representations of different first media objects based on subjective user ratings of the first media objects. In an embodiment, the mathematical representation of a media object is defined as a vector in which each user is considered a different dimension of the vector and the magnitude of the vector is the rating value for the media object assigned by the user. Based on the results of the comparison, a response to the request is generated. The response identifies at least one of the first media objects as being similar to the seed media object based on results of the comparison.

Yet another aspect of the disclosure is a method for identifying similar media objects based on user ratings. The method includes accessing a datastore of user ratings of media objects including a seed media object, a first media object and a second media object, in which each user rating includes a rating value associated with a user identifier and a media object. The method further includes identifying a seed set of user ratings associated with the seed media object, a first set of user ratings associated with the first media object and a second set of user ratings associated with the second media object. For each user identifier appearing in user ratings in both the seed set and the first set, the method generates a first object user similarity value based on the rating values of the user ratings of the seed media object and the first media object. Then the method calculates a first media object total similarity value based on the generated first object user similarity values. These steps are then repeated for the seed media object and the second media object to determine a second media object total similarity value based on the generated second object user similarity values. The method then compares the first media object total similarity value with the second media object total similarity value. Based on the comparison, one of the first or second media objects is identified as being more similar to the seed media object than the other media object. In this way, a similar media object can be selected given only a seed media object and a set of subjective user ratings.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

DETAILED DESCRIPTION

Systems and methods are described herein in which one or more media objects are identified as similar to a given media object (a "seed" object) based on subjective user ratings data. Even though the user ratings themselves are subjective ratings of the relative quality, or how much a submitting user likes or dislikes, a given media object, it has been empirically determined that such subjective user ratings can be used to accurately identify objectively similar media objects. The systems and methods do not require any knowledge of who the end user is or what the end user's tastes, likes or dislikes are. Thus, given a datastore of subjective user ratings for a library of media objects, the systems and methods can identify and recommend similar media objects to any given seed object for which user ratings exist in the datastore.

Figure 1:
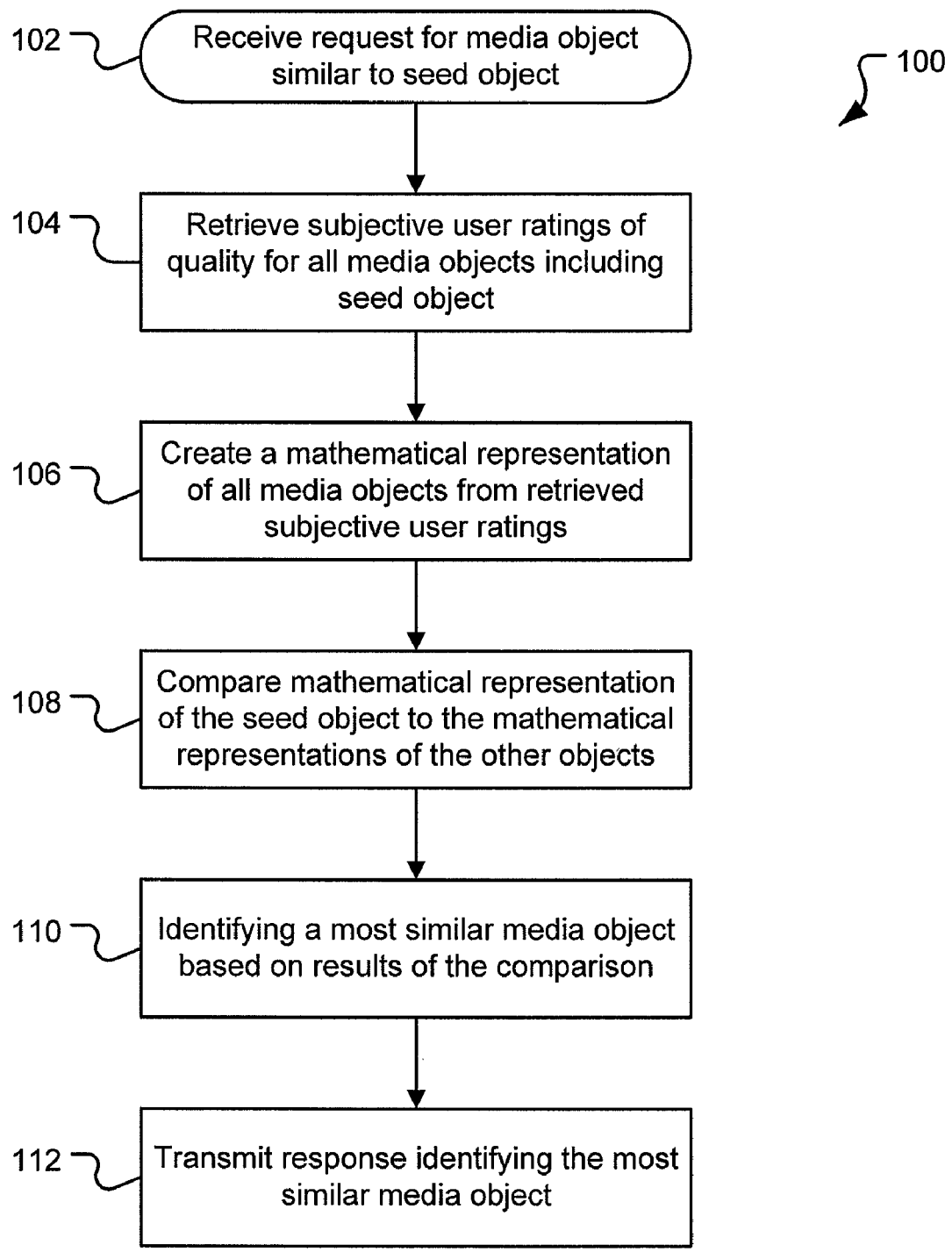
FIG. 1 illustrates an embodiment of a high-level method for identifying and recommending a media object similar to a seed media object.

FIG. 1 illustrates an embodiment of a high-level method for identifying and recommending a media object similar to a seed media object. The seed media object could be a true media object such as an audio file containing a song in .mp3 format or some other audio format or a video file containing a video clip or a movie in .mp4 or avi format or some other video format. Alternatively, the media object could be some other object of a known type such as a book or other physical product. In theory, the method could be adapted to judge similarity or make recommendations based on any type of objects for which user reviews are suitable, including restaurants, bicycles, vacations or food products.

The method 100 begins with the receipt of a request for a media object either to be provided or identified in a receive request operation 102. The request identifies a seed media object in some way and where to transmit the response to the request. However, the request may be anonymous in that there need not be any user associated with the request. This identification may be by title name and other textual information or may be using a media object identifier that can be parsed by the receiving system so that the seed object can be identified. The request either contains information, contains a command or is addressed such that the system receiving the request interprets the request as a request for a similar media object to the identified seed media object.

The request may be an electronic request such as an HTTP request generated by a user's web browser when clicking on a link on a web site or generated by an automated computer system such as a playlist generator, automated radio station, or electronic catalog. The request may be originally generated by a remote client device such as a user's personal computer or it may be received from another component on the same computing system. The software that generates the request could be a browser, a web page generator, a media player or some other software that requires a recommendation.

In response to receiving the request, the system retrieves subjective user ratings for media objects in a retrieve ratings operation 104. The retrieve ratings operation 104 may include identifying what type of media object is being requested. For example, the request may indicate that a media file of a specified type (e.g., song, movie, book, video clip, etc.) and/or format (e.g., an audio file in .wav format or a video file in .mov format) is to be recommended in response to the request.

In the retrieve ratings operation 104, a local and/or a remote database of user ratings of media objects is queried. In an embodiment, this may include generating and sending a request for user ratings to a remote device that has access to the ratings information. Regardless of the implementation, user ratings are accessed and either retrieved or inspected.

The user ratings retrieved, as described in greater detail below, include an identification of a user, the ratings that user gave a particular media object, and the media object being rated. More data may be accessed or provided depending on the embodiment. For example, in an embodiment a user tracking system may maintain a user database of information about users and their consumption of media objects. In the embodiment, user ratings are stored along with other user information (such as demographic information for each user, consumption history of each user, and number of ratings by each user). This additional information may be used when filtering what users are to be selected for comparison purposes.

User ratings may be either explicit or implicit ratings, depending on how the user ratings are generated. Explicit ratings are those supplied explicitly by the user, such as by submitting a rating through a media player interface or user rating interface. Selecting a star rating for a song is an example of the submission of an explicit rating. An implicit rating is information that is implied from a user's actions. For example, if a user has a history of playing songs by a certain artist, a system may assign an implied user rating for that user for all songs by that artist. Another implied user rating may be based on the number of times a user has played or rendered a media object, with objects that are played more frequently that some threshold being assigned an implicit rating. The systems and methods described herein may be adapted to use any user ratings, whether implicit or explicit, obtained by any means now known or later developed.

After retrieving the user ratings, the system creates a mathematical representation of each of the media objects, including the seed media object, in a representation creation operation 106. A mathematical representation may be created for all media objects for which there is one or more user ratings. In an alternative embodiment, a mathematical representation may be created for a particular media object only if the object has been reviewed by more than a predetermined threshold of users. In yet another embodiment, a filtering operation (not shown) may be performed to limit the number of media objects represented.

In the representation operation 106, each media object is represented mathematically based on the subjective user ratings retrieved. Based on the type of mathematical representation used, the mathematical representations may be modified or biased in order to account for a different number of user ratings from which the mathematical representation was derived. As described in greater detail below, this mathematical representation may be based on all user ratings of a given media object. In an alternative embodiment, the user ratings from a selected group of users instead of all of the rating users may be used. For example, only user ratings by those users that have rated more than a predetermined number of media objects or users that are within a certain demographic may be considered when creating the mathematical representation of a media object.

After creating a mathematical representation of each media object, the system compares each of the mathematical representations to a mathematical representation of the seed object in a comparison operation 108. In the comparison operation 108, the mathematical representations are compared to determine which media object or objects are the closest to the mathematical representation of the seed media object.

Based on the results of the comparison operation 108, similar media objects are identified in an identification operation 110. For example, in an embodiment (described further below) a vector may be used to mathematically represent each of the media objects. The comparison operation 108 may then calculate a difference between the vectors of each of the media objects and the vector of a seed object (e.g., by subtracting the vectors or by taking the dot product of the vectors) in order to identify a vector difference between the objects and the seed object. This vector difference is then used to identify which media objects are more similar to the seed object.

After identifying a similar media object in the identification operation 110, this information is used in order to generate and transmit a response to the initial requester in a transmit response operation 112. In that operation 112, a response may be generated that identifies or contains the media object or objects that were determined to be similar to the seed object in the identification operation 110. In response to a request for a similar media object, the system may transmit the name of a similar media object in response to the requestor. Alternatively, the system may transmit a copy of the recommended similar media object to the requester or a link or some other set of instructions for accessing a copy of the similar media object.

The method 100 is suitable for any situation in which a similar media object is needed. For example, in one embodiment, the method 100 may be used to implement a recommendation system. Given a recent purchase, the method 100 may be provided with the purchased item as a seed object and return a recommended next item. Alternatively, when provided multiple recent purchases, the method 100 could be used to identify a recommendation based on its similarity to all of the recent purchases.

As discussed elsewhere, the method 100 could also be used to create a virtual stream of media objects, each object being selected based on its similarity to the last object. As such, the method 100 could be used to create a virtual radio station or a virtual stream of videos or advertisements.

Figure 2:
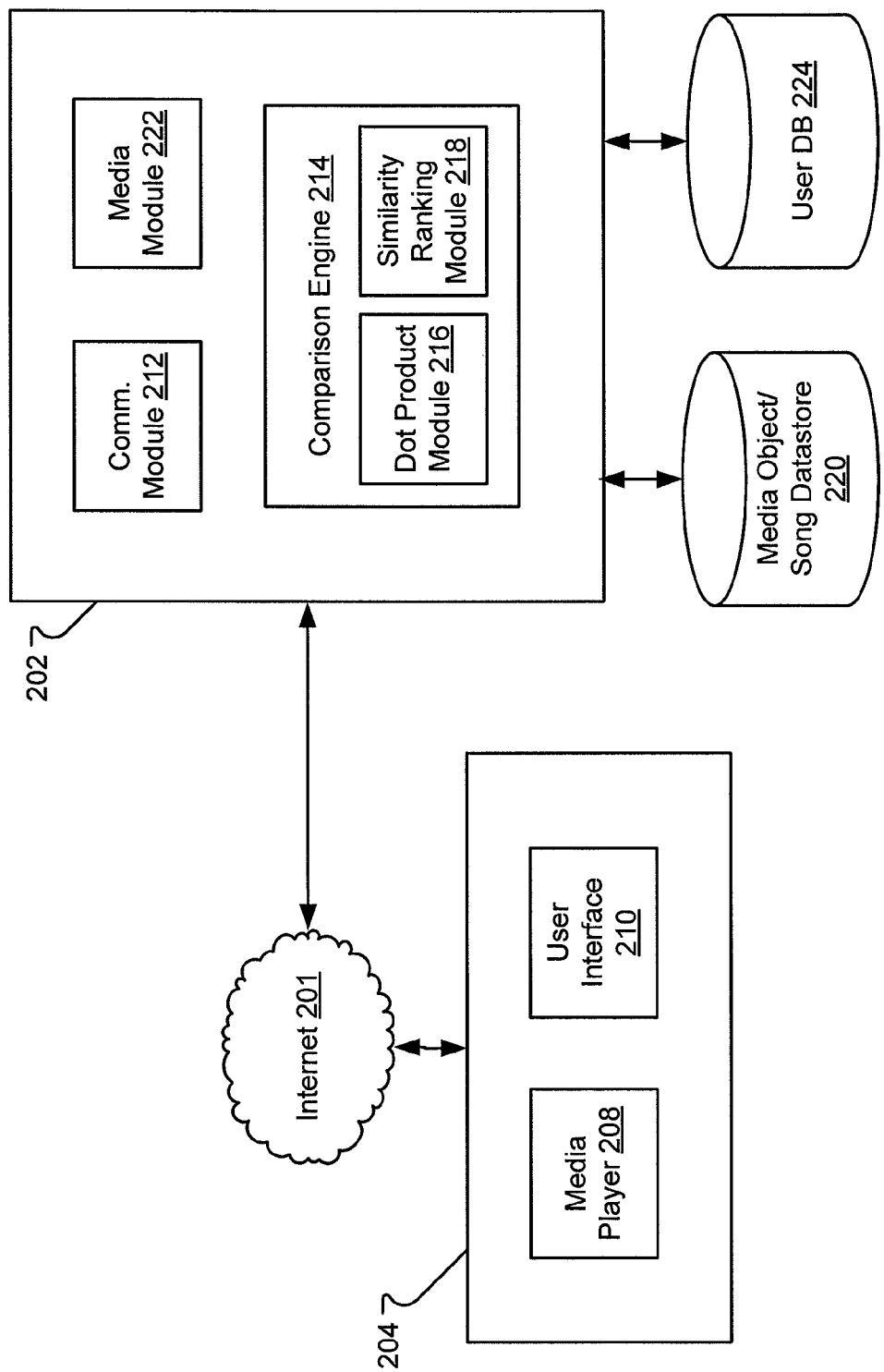
FIG. 2 is an illustration of a computing architecture including a recommendation system adapted to identify similar media objects based on a seed media object.

FIG. 2 is an illustration of an embodiment of a computing architecture including a recommendation system adapted to identify similar media objects based on a seed media object. Such a system may be considered a recommendation system that recommends one or more media objects based on their similarity to the seed media object. In the embodiment shown, a client-server architecture is illustrated which includes a recommendation server 202 connected via a network 201, e.g., the Internet 201, to one or more computing devices, such as the client computers 204 shown. The embodiment shown in FIG. 2 is discussed in terms of a similar media object recommendation system in which the media objects are songs. The reader will recognize that the system may be easily adapted to other media objects as well.

In the embodiment shown, a computing device such as the client 204 or server 202 typically includes a processor and memory for storing data and software as well as means for communicating with other computing devices, e.g., a network interface module. The computing devices are further provided with operating systems and can execute software applications in order to manipulate data. One skilled in the art will recognize that although referred to in the singular, a server may actually consist of a plurality of computing devices that operate together to provide data in response to requests from other computing devices. Thus, as used herein the term server more accurately refers to a computing device or set of computing devices that work together to respond to specific requests. Computing devices may be general purpose devices such as those known in the art as personal computers (PCs) or, alternatively, special-purpose computing devices such as blade servers.

In a computing device, local files, such as media files or raw data, may be stored on a mass storage device (not shown) that is connected to or part of any of the computing devices described herein including the client 204 or a server 202. A mass storage device and its associated computer-readable media, provide non-volatile storage for the computing device. Although the description of computer-readable media contained herein refers to a mass storage device, such as a hard disk or CD-ROM drive, it should be appreciated by those skilled in the art that computer-readable media can be any available media that can be accessed by the computing device and from which information may be retrieved.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

In the embodiment shown, the client computing device 204 is illustrated as including a media player 208 and a user interface 210. The media player 208 is adapted to render songs to a user of the client 204 using peripheral electronics such as speakers, headphones and/or amplifiers that are either integral to or connected to the client 204. Examples of media players include YAHOO! MUSIC JUKEBOX and WINDOWS Media Player.

The client 204 as shown further includes a user interface 210 adapted to allow the client to interface with the recommendation server 202 and the recommendation system. In an embodiment, the user interface 210 may be a browser adapted to request and display web pages served by the recommendation system. Through the displayed web pages, the client 204 may interact with the recommendation system and receive recommendations and play songs selected and transmitted to the client 204 by the server 202. In an alternative embodiment, the user interface 210 may be a purpose-built software module adapted to interface directly with the recommendation server 202 and its modules. In yet another embodiment, the media player 208 may interact directly with the recommendation server 202.

The system includes a recommendation server 202. The recommendation server 202 may be a standalone device or may be implemented as part of a server that provides additional services. For example, in an embodiment the recommendation system is implemented as part of a media server through which clients 204 may select and play songs from an associated database 220 of songs. In another embodiment, the recommendation system may be implemented as part of a electronic commerce server through which clients 204 may play, display information for, and/or purchase songs, videos or physical devices such as compact discs, books or other related media objects.

The recommendation server 202 as shown includes a communication module 212, a media module 222 and a comparison engine 214. The communication module 212 is adapted to receive and transmit communications from clients 204 and/or other computing devices (not shown). In an embodiment, the communications module 212 can identify requests from clients 204 to identify or provide similar media objects to the requesting client 204 and communicate these requests to the other components. Such requests may be generated by the client's media player 208, such as in response to a user command to the media player 208 to play more songs like the one that the user is currently listening to or in response to a user command to generate a stream of music (e.g., a virtual radio station). As discussed above, other examples are possible when considering media objects other than songs. For example, requests from a retail website for recommendations of similar media objects to be presented to a potential purchaser with a known interest in a seed media object.

The communication module 212 may be further adapted to format, generate and transmit responses to the requesting device based on the results provided by the other components. The communication module 212 may be adapted to support many different types of requests from many different types of clients, providing the necessary interface and translation services between the clients and the other components.

As discussed in greater detail below, when a request to identify a similar song or media object is received the communication module 212 processes the request and transmits the necessary information to the comparison engine 214. In an embodiment, the information provided may consist only of an identification of the seed song. In an alternative embodiment, more information may also be provided including contextual information such as information known about the requestor or additional filter criteria to be used by the comparison engine 214.

The comparison engine 214 has access to a database 224 of user ratings of media objects, in the example embodiment shown the database is a datastore of song ratings by different users. In an embodiment, the user ratings are the stored data associated with the user rating information commonly extracted from users by media players. In an embodiment, such user ratings are typically received as a user selection of a rating of one to five stars based on the user's subjective taste. The user rating database 224 may be a separate and independent datastore to which the recommendation server 202 has access, for example the main user database operated by an internet media service. Alternatively, the user rating database 224 could be a proprietary database of ratings obtained, implicitly or explicitly, by the recommendation server either by purchase or via user's interaction with the recommendation server over time.

The user rating database 224 includes information about user's subjective ratings of media objects, in this case songs. In an embodiment, each user rating includes an identification of the user that gave the rating. This identification could be a user identifier such as a login name, an account name, client device identifier or some other identifier that can be used to identify that one or more ratings of different songs were made by the same user.

Each user rating will also include a rating value. The rating value could be a number, such as an integer from one to five corresponding to the number of stars selected by the user. Alternatively, the rating value could be any numerical representation of a rating selected by the associated user regardless of the way in which the user selects the rating.

Each user rating further includes some identification of the song that the rating is for. This may be a media object identifier (ID) that is associated with a media object in a media datastore. Thus, the media object ID may be proprietary identifier. Alternatively, the media object ID may be some variation of the textual information (e.g., artist, title and album information) from which a media object may be identified.

For example, in an embodiment a user rating may be characterized as "George12345; 5, Jethro Tull-Aqualung" in which the user giving the rating is George12345, the rating has a value of 5 in some known rating scale used by the comparison engine, and the song associated with this rating value by George 12345 is the song Aqualung by Jethro Tull. One skilled in the art of data storage and database management will recognize that there are many ways such data may be stored for retrieval and that the actual data stored could be modified and still be easily retrievable from the user rating database 224.

As discussed above, the user rating database 224 may include additional information such as information about each known user's likes and dislikes and a user's consumption history such as how many times users have played a song. Depending on the embodiment, such information may or may not be used by the comparison engine 214 as discussed in greater detail below.

The comparison engine 214 uses the user ratings to identify songs similar to the seed song identified by the request. As discussed in greater detail in the example, it has been determined that even though the user ratings are subjective, collectively the user ratings can be used to accurately identify objectively similar songs without any other information such as objective song analyses or information about the requester (i.e., without knowing who is requesting the song or what the requestor's likes and dislikes are).

As discussed in greater with reference to the methods described below, the comparison engine 214 uses the user ratings to generate a mathematical representation of each song in the user ratings database and then compares the different mathematical representations. Based on the comparison, songs with similar mathematical representations are identified and the closest are selected as being similar songs.

The comparison engine 214 may or may not filter the songs prior to performing the comparison. For example, a request may include a filter criteria such as a criteria to exclude certain artists or genres from the analysis so as to prevent the possibility of those artists or genres as being identified and returned to the sender as similar songs. Alternatively, filtering can also be done based on information tracked by the recommendation system 202 such as information about previous recommendations of similar songs to the same requester or, as discussed further below, filtering out songs from the same artist as the seed song due to the observation that some embodiments of the systems and methods may preferentially identify songs from the same artist as similar. In addition, songs with relatively few ratings may be filtered out from the comparison as well. Such filtering may be achieved by a filtering module (not shown).

In the embodiment shown, the comparison engine 214 represents each song as a multi-dimensional vector in which each dimension corresponds to a different user and the magnitude associated with that dimension corresponds to that user's rating (e.g., the rating value or a numerical value derived from the rating value such as a biased rating value) of the song. Thus, if 5,000 users have rated a particular song, the mathematical representation of the song will be a vector with at least 5,000 dimensions. In an alternative embodiment, each vector may have a dimension for every known user listed in the database 224 but, for those users that have not rated a particular song, the magnitude of the song in that dimension may be set to zero. The vectors may be normalized as discussed below to prevent songs that have relatively more or less user reviews from skewing the results.

In the embodiment shown, the comparison engine 214 compares the vectors by taking the dot product of the vectors as opposed to the subtraction method discussed previously. The comparison engine 214 includes a dot product module that independently calculates the dot product of the seed song's vector with each of the other songs identified in the user database 224. The result of taking the dot product of the two vectors is a scalar based on the magnitudes of the vectors in each dimension. The dot product result may be temporarily or permanently stored for later use by the similarity ranking module 218. In an alternative embodiment (not shown), the dot product module may be substituted for a subtraction module or some other module that performs a mathematical operation or operations on the mathematical representations of the media objects.

The dot product result is used by the comparison engine 214 as a measure of the relative difference between the two songs represented by the vectors. In the embodiment shown, the song or songs with the highest dot product result with the seed song are then identified as similar to the seed song by a similarity ranking module 218. In alternative embodiments in which different mathematical representations are used, the similarity ranking module 214 may perform a more complex analysis than simply identifying the song or songs with the highest dot product result when calculated to the seed song's vector. For example, if a vector subtraction is used instead of taking the dot product of the vectors, then the similarity ranking module 218 may identify the song with the smallest resulting vector as the most similar song to the seed song.

The similarity ranking module 218 may also perform a filtering operation to screen out certain songs identified as similar or to select songs with less similar results instead of songs with more similar results based on some additional factors. For example, if the similarity ranking module 218 identifies five songs in decreasing order of similarity, it may perform a secondary filtering so as not to recommend songs that have been recently played. Alternatively, a filtering may be performed based on information about the songs identified as similar (e.g., genre, artist or other information stored as metadata associated with the songs) obtained from the attached song datastore 220 or the user ratings database 224.

The output of the comparison engine 214 may be an identification of one or more similar media objects. Depending on the nature of the request received, this may be the only information necessary in order to respond to the request and the communication module 212 may generate the response from the output of the comparison engine 214.

However, in the embodiment shown, the recommendation server 202 also includes a media module 222 that interfaces with a library of a songs such as a datastore of electronic song media files 220. Again, the media object datastore 220 may be a local datastore containing objects or information about objects or may be an independent and remote datastore or database server system from which the recommendation server 202 may retrieve objects and object information. The media module 222 allows the system to actually retrieve the media object identified by the comparison engine 214 as similar to the seed object and transmit the similar object to the client 204. This makes the system suitable for providing virtual radio stations or other streams of similar music, video or articles in addition to simply identifying similar songs.

FIGS. 1 and 2 discussed embodiments of the similarity identification systems and methods, in general terms, of identifying similar media objects without specific limitation to the type of media object. The following discussion describes more detailed embodiments using songs, and specifically electronic audio files containing music, as the subject. One skilled in the art will recognize that the embodiments described are not so limited and could be easily adapted to any type of media object.

Figure 3:
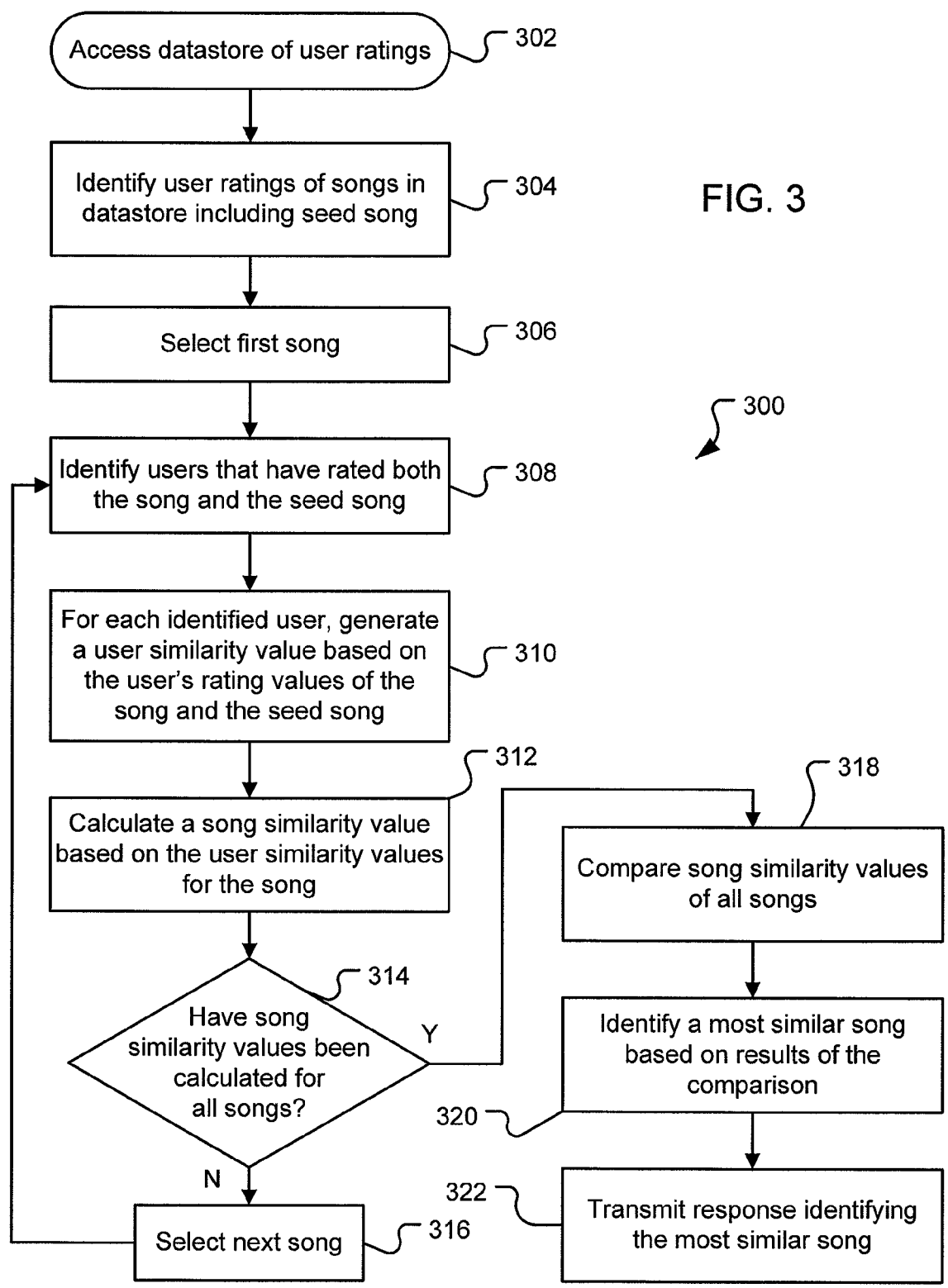
FIG. 3 illustrates an embodiment of a method for identifying songs similar to a seed song.

FIG. 3 illustrates an embodiment of a method for identifying songs similar to a seed song. In the method 300, the system has access to a datastore containing user ratings of a group of songs including the seed song. In response to some prompt, such as a request to identify a similar song or a request for a next song in a series of songs, the system accesses the data store of user ratings in an access operation 302. The access operation 302 may include transmitting a request to a remote database for the required user rating information or may include accessing a local datastore.

An identification operation 304 then identifies the songs for which the datastore has user ratings. The identify operation 304 may be performed by the datastore as part of responding to the accessing operation 302. Alternatively, the accessing operation 302 may simply provide a set of data that still must be sorted and ordered to process the data into a usable form.

After obtaining the user ratings of the songs, a first song is selected to be compared to the seed song in a select operation 306. For that selected song, the method 300 next identifies the users that have rated the selected song and the seed song in an identify users operation 308.

Next, in a generation operation 310, a similarity value based on a selected user's ratings values of the selected song and seed song is generated. The user similarity value could be a simple comparison, such as a subtraction of the user rating of the seed song and the user rating of the second song. Alternatively, depending on the nature of the user ratings information known, the user similarity value could be generated based on a more complicated algorithm. For example, in an embodiment, the user similarity value may be a multiplication of the user rating of the seed song with the user rating of a selected song. The generation operation 310 could include biasing the user ratings in some manner.

After generating a user similarity value for the selected song relative to the seed song, a song similarity value is calculated in the calculation operation 312. In an embodiment, the song similarity value may be considered a total similarity value that is a mathematical value that represents how similar the selected song is to the seed song. Depending on the embodiment, the calculation operation 312 may be a simple or complex calculation based on the user similarity values. For example, in one embodiment the calculation may be a simple summation of all of the user similarity values. In more complex embodiments, certain users known to be particularly good sources of ratings may be given more weight than other users by the use of a dynamically generated rating factor. The calculation operation 312 may or may not also normalize the total similarity value based on the number of users providing ratings.

After the song similarity value has been generated, a determination operation 314 determines if there are any remaining songs in a datastore of songs for which a total similarity value needs to be generated. If song similarity values have not been calculated for all the songs in the datastore, the next song selected in a selection operation 316 in the flow returns to the user identification operation 308 and the calculation operations 310, 312 are repeated for the next selected song. In this way, the method 300 ultimately generates a song similarity value for each song in the database.

In one embodiment, some songs may not be evaluated based on a filtering operation (not shown) that occurs prior to the first song selection operation 306 or within some other operation, such as the user identification operation 308. For example, if less than a threshold number of users have rated a selected song, or if there are less than some predetermined number of users that have rated both the seed song and a selected song, then that song may not be evaluated and a similarity value may not be determined.

Songs may be filtered for various reasons. As mentioned above, songs may be filtered because they lack a threshold number of user ratings to be deemed sufficient for calculating similarity. Alternatively, songs may be filtered based on their genre, artist, or some other piece of information or criteria to the system.

User ratings may also be filtered in a like manner so that some user ratings are considered when calculating a user similarity value while others are ignored. Such filtering may be based on any type of information known about the users such as number of songs rated by the user and/or demographic information such as sex, age, location, income, etc. For example, the method 300 may only use user ratings from "super-users" that have rated 1,000 or more songs.

After song similarity values have been calculated for all songs, a comparison operation compares the song similarity values of all songs to each other in a comparison operation 318. Based on the results of the comparison operation 318, one or more songs are selected as being similar in a similar song identification operation 320. After the similar song identification operation 320, the information concerning the selected similar song(s) is formatted and transmitted as necessary to respond to the impetus which initiated the method 300.

For example, if the method 300 initiated as a result of a request from the media player for a next song similar to a seed song, the response generated may identify the similar song, may provide a link to the similar song through which the media player can access the seed song, or the system could retrieve and transmit the identified similar song to the media player. In embodiments in which a request was received from a computing device, such as that of an online retailer, solely for an identification of a similar media object or song, that information may be transmitted to the requestor in the format expected by the requester.

Figure 4:
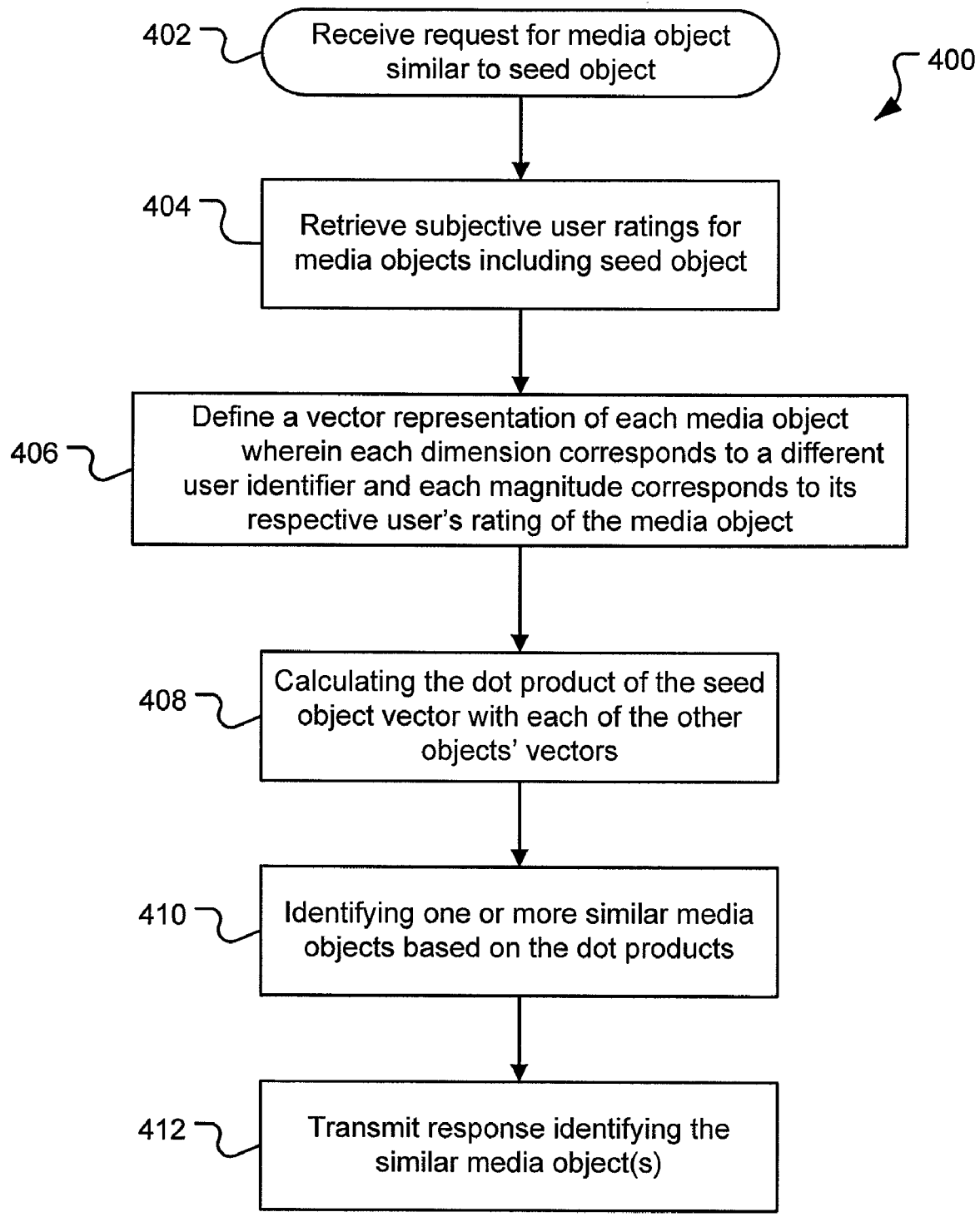
FIG. 4 illustrates another embodiment of a method for identifying and recommending a media object similar to a seed media object.

FIG. 4 illustrates another embodiment of a method for identifying and recommending a media object similar to a seed media object. In the embodiment shown, the method begins with a receive operation in which a request for a similar media object is received. The request identifies a seed object, and from this object the method 400 is to identify a similar media object.

In response to the receive operation 402, the system retrieves subjective user ratings for media objects in a retrieval operation 404. As discussed above, the subjective user ratings retrieved may have been provided by users or reviewers or other parties for an entirely different purpose, but are stored in a datastore accessible by the system. The user ratings, as described above, include a user identifier, an identifier of the media object being reviewed or rated, and some user rating or rating value of the media object.

In the embodiment described, after the user ratings have been retrieved, each media object is represented as a vector in multi-dimensional space in a vector definition operation 406. The vector representation of each media object uses each user identifier or individual user that has rated the object as a dimension. The vector has a magnitude and each dimension element is based on that respective user's rating of the media object. For example, if a media object is rated by a user as having four stars and rated by a second user as having five stars, the vector representation of that media object would be $4i+5j$ where i denotes the dimension corresponding to the first user and j denotes the dimension corresponding to the second user. In this way, the media object can be represented as a vector.

As a simple example consider a group of three users that have rated songs: Ujazz, Urock, and Uclassical. Such ratings may be as follows:

| User ID | Song 1 Rating | Song 2 Rating | Song 3 Rating |
| --- | --- | --- | --- |
| Ujazz | 5 | 0 | 5 |
| Urock | 5 | 0 | 5 |
| Uclassical | 0 | 5 | 0 |

The vector representations resulting from the small user group above for song 1 would be $5i+0j+5k$, for song 2 the vector would be $5i+0j+5k$ and for song 3 the vector would be $0i+5j+0k$.

In an embodiment, vectors may be normalized to have a scalar of magnitude of 1. Normalization results in preventing media objects with relatively more ratings by users from having a different magnitude than media objects having relatively fewer user ratings.

A calculation operation 408 next compares the vector representation of each media object to the seed media object. One type of comparison is to determine the Euclidean distance between the two vectors, that is if the vectors originated at the same starting point, the distance between the two end points is determined. In the embodiment shown, the method 300 calculates the dot product of the media object's normalized vector representation with the normalized vector representation of the seed object. The dot product is an algebraic calculation through which the difference between two vectors is determined and that difference is represented as a single value scalar. If the vectors are normalized, the cosine distance (given by the dot product) and the Euclidean distance are isomorphic and thus will yield the same relative results as a straight vector subtraction.

Continuing the Ujazz, UClassical and Urock example from above, if the seed song is song 1 in the calculation operation the dot product of song 2 with song 1 and the dot product of song 3 with song 1 are taken. One way of calculating the dot product is to multiple the magnitudes of each dimension and sum the results (i.e., if vector $F=a_1i+b_1j+c_1k$ and vector $G=a_2i+b_2j+c_2k$, then $F \bullet G=a_1a_2+b_1b_2+c_1c_2$ noting that the quantities $a_1a_2$, $b_1b_2$ and $c_1c_2$ could be considered user similarity values which are then summed to obtain a total song similarity value). If the vectors for songs 1, 2 and 3 have been normalized, then the dot product of song 2 with song 1 results in a value of 1 and the dot product of song 3 with song 1 results in a value of 0.

After the dot product between each of the media objects' vectors to the seed object's vector has been determined, a plurality of dot product results, one for each evaluated media object, is obtained. One or more similar media objects are then identified based on the dot product results in an identification operation 410. In the embodiment discussed, if normalized vectors are used, the dot product between vectors will be a number between 1 and 0. The higher the number, the closer any vector representation of a media object is to the vector representation of the seed object. For example, the dot product of a vector for the seed object to itself returns a result of 1 because the vectors are identical. Objects with similar user ratings will have similar vector representations, and the dot product of those media objects with the seed media object will be higher than the dot product of media objects that are not similarly rated by the same users to the seed media object.

As discussed above, the identification operation 410 may be a simple selection of the song (or songs depending on the number of songs requested) with the highest dot product result. Alternatively, a more complex selection process may be used. For example, in an embodiment for identifying similar songs, songs by the same artist as a seed song may be filtered out so that the method 400 is forced to return songs by different artists. In yet another embodiment, a past consumption history for the requestor may be available and songs that have been recently consumed by the requestor may be filtered out so as not to be selected. If information is known about the requester related to likes and dislikes, media objects that have been flagged as being disliked may be omitted from consideration during the identification operation 410.

Continuing the Ujazz, UClassical and Urock example from above, the identification operation 410 will identify song 2 as being more similar to song 1 than song three based on the comparison of the dot product results derived from the subjective user ratings of each song.

After similar media objects are identified in the identification operation 410, a response is transmitted to the requestor that issued the request received in the receive request operation 402. The response may identify the similar media object or objects, the response may include one or more of the identified similar media objects, or the response may include a link or some information allowing the requestor to access the identified similar media object or objects.

EXAMPLES

An experiment was performed using a test data set of users' ratings and an embodiment of a similarity method as described below. In the experiment, the variable r(u,s) was defined as a description of the user u's rating for media object s. The vector $r_s$ is an $N_u$-dimensional vector of all the rating data for object s. The vector $r_s$ may span any range of values and an increased preference for a media object may either be represented by increasing or decreasing values of $r_s$.

In a large database of users and media objects, many ratings may be undefined. For undefined ratings, a value of zero was specified. The vector $r_s$ was normalized to account for unrated media objects. The normalized vector may be written as $$\vec{r}_s' = (\vec{r}_s - b)/|\vec{r}_s - b| \quad (1)$$

where the bias, b, may be an assumed value for all unrated media objects. The similarity between two media objects $s_1$ and $s_2$ was determined by taking the dot product of the two normalized vectors $$s = \vec{r}_{s1}' \cdot \vec{r}_{s1}' \quad (2)$$

Given a query with an initial seed song, a playlist may be generated by finding the songs in a database that have the highest similarity according to Equation 2.

In the embodiment shown, a bias of 0 was selected for experimentation purposes. This had the effect of removing unrated media objects from consideration. In alternative embodiments that utilize different forms of user ratings or different mathematical comparisons, the bias, b, may be calculated or estimated in order to prevent missing or inconsistent user ratings from skewing the analyses.

Using the disclosed rating-based method, and setting b equal to 0, various experiments showed that the disclosed user-rating similarity method more effectively generated playlists with similar songs than did content-based methods (i.e., methods that attempt to categorize the content of a song or media object based on an analysis of the objective data—e.g., beat, brightness, timbre, etc.).

Example 1

In one experiment a database of 1,449,335 ratings of jazz songs provided by the Yahoo! Music service users was gathered and the 1000 songs with the most ratings were selected. The number of ratings per song ranged from "Sunrise" by Norah Jones with 98,658 ratings to a song by Os Nosos with 118 ratings. 380,911 users contributed to these ratings, with one user rating 913 songs and many users rating only one of these jazz songs.

In the experiment, a similarity matrix was produced using the 1,000 song database and Equation 2 with b set to 0. To analyze these results, a benchmark was needed. One benchmark was to note that songs produced by a single artist or songs that resided on the same album should have a larger degree of similarity than a random set of songs. Thus, it was expected that the user-rating similarity method would assign a higher degree of similarity to songs by the same artist. The database was arranged such that songs by the same artist or album were arranged consecutively.

Figure 5:
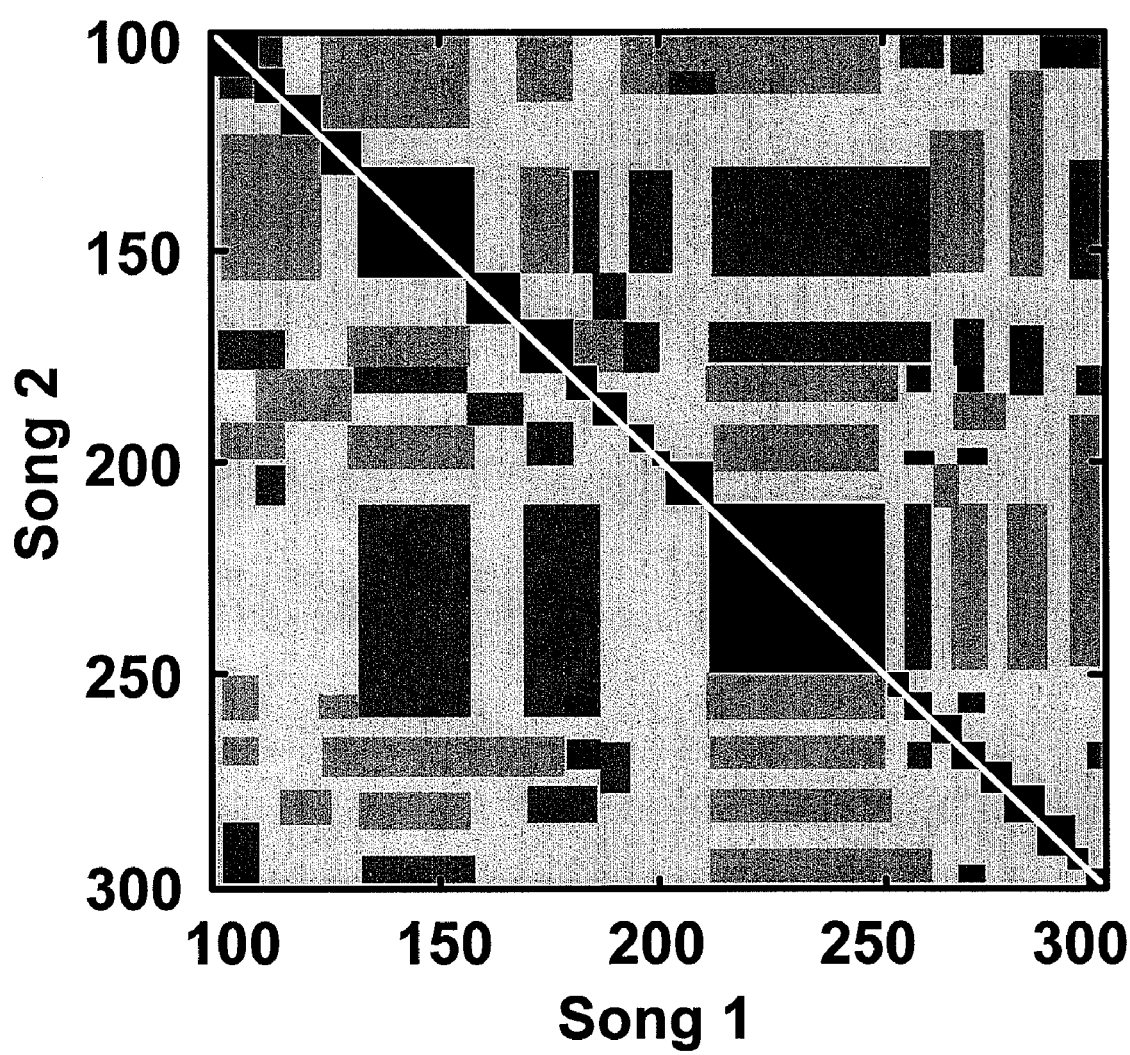
FIG. 5 graphically illustrates a 200×200 song segment of the similarity matrix calculated from the test data.

FIG. 5 graphically illustrates a 200×200 song sub-segment of the similarity matrix calculated from the test data. FIG. 5 shows songs by their assigned song ID number along two axes. The diagonal line from the upper left to the lower right represents the similarity of songs to themselves. Except for that line (purely for display purposes, the values on the line are represented as having a value of zero), larger s values (i.e. greater similarity between two songs), are represented by darker colored pixels. It was recognized that in FIG. 5 the dark squares, or regions of song similarity, corresponded to groups of songs by the same artist or album. Hence, the calculated similarity matrix closely resembled the expected results: dark regions overlapped regions where songs were by the same artist or from the same album.

Example 2

In another experiment, the disclosed method and a content-based similarity system were used to generate playlists based on various seed songs using the same data set as in Example 1. The number of songs on a generated playlist by the artist used for the seed song was recorded (since it was again assumed that song similarity can be measured by whether or not two songs are by the same artist). The average number of these songs was calculated for all seed songs performed using both similarity methods. In the experiment, on average there were approximately 0.8 artist matches per 50-song playlist generated using the content-based method and 2.3 artist matches per playlist generated by the user rating-based similarity method. These results provided an indication that the disclosed rating-based method is more effective in generating song-similar playlists, than the content-based method used.

Example 3

In another experiment using the same data set as described in Example 1, a seed song was presented to an 18-person study group of listeners along with three playlists: similar songs based on content, similar songs based on ratings created using the disclosed rating-based vector analysis described above, and a random playlist of songs. In the study, half of the listeners were asked to identify which playlist contained songs that were most similar to the seed song and half of the listeners were asked to identify which of the three playlists contained songs that were least similar to the seed song. The songs were not identified in any manner. The order of the three lists was randomized, and each list (except for the randomly generated list) showed the 10 most similar songs based on the seed song using its respective similarity method. For each song there was a button that the user could press to hear a 30-second sample of the song. The results are provided in Table 1 below.

TABLE 1

| Method used to generate playlist | Most Similar Votes | Least Similar Votes |
|---|---|---|
| Randomly selected | 1 | 13 |
| Content-based | 1 | 4 |
| Subjective rating-based | 16 | 1 |

The results in Table 1 illustrate that the disclosed user-rating method generated the most similar playlist according to the 18-person study.

Example 4

In another experiment, a subset of the Yahoo! Research Music Rating Database, with just those songs that are classified with a genre of "jazz" was used. This dataset included approximately 3,500 songs for which a total of approximately 185,000 ratings from 185,000 users were known. In the experiment, the dataset was limited to those songs with more than 100 user ratings.

The vector analysis as described above was performed on the user ratings using the song "If I Could Give You More" by Harry Connick, Jr., as the seed song. A sample of the dot product results is provided below in Table 2. The results indicate that the first 177 songs had the same artist.

TABLE 2

| Rank | Artist | Album # | Track Name | Dot Product |
|---|---|---|---|---|
| 1: | Harry Connick, Jr. | 14771 | If I Could Give You More | 1.000000 |
| 2: | Harry Connick, Jr. | 14771 | With Imagination (I'll Get There) | 0.635055 |
| 3: | Harry Connick, Jr. | 14771 | A Blessing And A Curse | 0.625623 |
| 4: | Harry Connick, Jr. | 14771 | She Belongs To Me | 0.622935 |
| 5: | Harry Connick, Jr. | 14771 | Just Kiss Me | 0.604594 |
| 6: | Harry Connick, Jr. | 14771 | Blue Light, Red Light (Someone's There) | 0.602260 |
| 7: | Harry Connick, Jr. | 14771 | Sonny Cried | 0.599379 |
| 8: | Harry Connick, Jr. | 14771 | You Didn't Know Me When | 0.599181 |
| 9: | Harry Connick, Jr. | 14771 | Jill | 0.590599 |
| 10: | Harry Connick, Jr. | 14771 | The Last Payday | 0.589825 |
| 11: | Harry Connick, Jr. | 14771 | It's Time | 0.564469 |
| 12: | Harry Connick, Jr. | 14769 | Moment's Notice | 0.360809 |
| 13: | Harry Connick, Jr. | 14759 | Between Us | 0.348063 |
| . | . | . | . | . |
| . | . | . | . | . |
| . | . | . | . | . |
| 176: | Harry Connick, Jr. | 20050062 | I Like Love More | 0.098471 |
| 177: | Harry Connick, Jr. | 20050062 | Lose | 0.096879 |
| 178: | Original Motion Picture Soundtrack | 39246 | Don't Get Around Much Anymore | 0.078027 |
| 179: | Keely Smith | 136497 | The House I Live In/Star Spangled Banner | 0.076807 |
| 180: | Original Motion Picture Soundtrack | 39246 | I Could Write A Book | 0.074436 |

TABLE 2-continued

| Rank | Artist | Album # | Track Name | Dot Product |
|---|---|---|---|---|
| 181: | Original Motion Picture Soundtrack | 39246 | Let's Call The Whole Thing Off | 0.073013 |
| 182: | Original Motion Picture Soundtrack | 39246 | Love Is Here To Stay | 0.072106 |
| 183: | Original Motion Picture Soundtrack | 39246 | Autumn In New York | 0.071370 |
| 184: | Original Motion Picture Soundtrack | 39246 | Stompin' At The Savoy | 0.070577 |
| 185: | Ann Hampton Callaway | 38051 | I'll Be Seeing You | 0.068682 |
| 186: | Keely Smith | 136497 | Love For Sale | 0.067158 |

The systems and methods described herein may be used in a number of ways. For example, a recommendation system may be created in which the media object or objects that are identified as similar to a seed media object may be recommended or otherwise selected. In one embodiment, the systems and methods described could create a virtual radio station that, given a seed song selection, serially selects each subsequent song based on its similarity to the immediately previous song. The systems and methods could also be used to generate playlists of similar objects for later use.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. Numerous other changes may be made that will readily suggest themselves to those skilled in the art and which are encompassed in the spirit of the invention disclosed and as defined in the appended claims.

What is claimed is:

1. A method for identifying similar media objects comprising:

accessing, using one or more computing devices, a datastore of user ratings of media objects including a seed media object, a first media object and a second media object, individual user ratings including a rating value associated with a user identifier and a media object, individual user ratings corresponding to a user and based at least in part on input supplied by the user;

receiving, using the one or more computing devices, a user-anonymous request for a media object that is similar to the seed media object; and identifying, using the one or more computing devices, one of a first media object and a second media object as more similar to the seed media object using the user ratings, the identifying comprising:

identifying, using the one or more computing devices, a seed set of user ratings associated with the seed media object, a first set of user ratings associated with the first media object and a second set of user ratings associated with the second media object;

for respective user identifiers appearing in user ratings in both the seed set and the first set, generating, using the one or more computing devices, a first object user similarity value based at least in part on the rating values of the user ratings of the seed media object and the first media object;

calculating, using the one or more computing devices, a first media object total similarity value based on the generated first object user similarity values;

for respective user identifiers appearing in user ratings in both the seed set and the second set, generating, using the one or more computing devices, a second object user similarity value based on the rating values of the user ratings of the seed media object and the second media object;

calculating, using the one or more computing devices, a second media object total similarity value based at least in part on the generated second object user similarity values;

comparing, using the one or more computing devices, the first media object total similarity value with the second media object total similarity value, wherein the comparing comprises characterizing the first media object and the second media object individually as vectors having a plurality of dimensions and magnitudes, wherein individual vectors of the first and second media objects comprise a plurality of magnitudes individually associated with a different dimension in multi-dimensional space, wherein individual dimensions correspond to a respective user identifier and individual magnitudes correspond to a rating value assigned to a respective media object by a user corresponding to the user identifier.

2. The method of claim 1, further comprising:

biasing the rating value of individual user ratings by a predetermined factor before generating the first object user similarity value and the second object user similarity value.

3. The method of claim 1, further comprising:
maintaining a library of media objects including the seed media object, the first media object and the second media object;
receiving the user ratings from users accessing the library of media objects; and
storing the user ratings in the datastore.

4. The method of claim 1, further comprising:
transmitting a response identifying one of the first media object and the second media object identified in the identifying operation as a media object that is more similar to the seed media object.

5. The method of claim 1, wherein identifying the seed set, the first set and the second set further comprises:
identifying as the seed set user ratings associated with the seed media object contained in the datastore;
identifying as the first set user ratings associated with the first media object contained in the datastore; and
identifying as the second set user ratings associated with the second media object contained in the datastore.

6. The method of claim 1, wherein the identifying the seed set, the first set and the second set further comprises:
identifying a subset of user identifiers as super-users;
identifying as the seed set user ratings associated with the seed media object and a super-user contained in the datastore;
identifying as the first set user ratings associated with the first media object and a super-user contained in the datastore; and
identifying as the second set user ratings associated with the second media object and a super-user contained in the datastore.

7. The method of claim 1, wherein the generating the first and second object user similarity values further comprises:
for respective user identifiers having a user rating for the seed set of user ratings and the first set of user ratings, multiplying a rating value of the seed media object with a rating value of the first media object; and
for respective user identifiers having a user rating for the seed set of user ratings and the second set of user ratings, multiplying a rating value of the seed media object with a rating value of the second media object.

8. The method of claim 7, wherein calculating the first and second object total similarity values further comprises:
adding the generated first object user similarity values to obtain the first object total similarity value; and
adding the generated second object user similarity values to obtain the second object total similarity value.

9. The method of claim 1, wherein generating the first and second object user similarity values further comprises:
for individual user identifiers having a user rating for the seed set of user ratings and the first set of user ratings, generating a first object user similarity value by subtracting the rating value of the first media object with the rating value of the seed media object; and
for individual user identifiers having a user rating for the seed set of user ratings and the second set of user ratings, generating a second object user similarity value by subtracting the rating value of the second media object with the rating value of the seed media object.

10. The method of claim 9, wherein calculating the first and second object total similarity values further comprises:
squaring respective generated first object user similarity values to obtain a set of squared first object user similarity values;
adding respective squared first object user similarity values to obtain the first object total similarity value;
squaring respective generated second object user similarity values to obtain a set of squared second object user similarity values; and
adding respective squared second object user similarity values to obtain the second object total similarity value.

11. An apparatus, comprising:
a memory to store a plurality of user ratings of respective media objects including a seed media object, a first media object and a second media object, wherein individual user ratings comprise a rating value associated with a user identifier and a media object, the individual user ratings corresponding to a user and based at least in part on input supplied by the user;
a communications module to receive a user-anonymous request for a media object that is similar to the seed media object; and
a processor to identify one of a first media object and a second media object as more similar to the seed media object using the user ratings, the processor to identify the one of the first media object and the second media object as more similar to the seed media object at least in part by:
identifying a seed set of user ratings associated with the seed media object, a first set of user ratings associated with the first media object and a second set of user ratings associated with the second media object,
for respective user identifiers appearing in user ratings in both the seed set and the first set, generating a first object user similarity value based at least in part on the rating values of the user ratings of the seed media object and the first media object,
calculating a first media object total similarity value based on the generated first object user similarity values,
for respective user identifiers appearing in user ratings in both the seed set and the second set, generating a second object user similarity value based on the rating values of the user ratings of the seed media object and the second media object,
calculating a second media object total similarity value based at least in part on the generated second object user similarity values, and
comparing the first media object total similarity value with the second media object total similarity value, wherein the comparing comprises characterizing the first media object and the second media object individually as vectors having a plurality of dimensions and magnitudes, wherein individual vectors of the first and second media objects comprise a plurality of magnitudes individually associated with a different dimension in multi-dimensional space, wherein individual dimensions correspond to a respective user identifier and individual magnitudes correspond to a rating value assigned to a respective media object by a user corresponding to the user identifier.

12. The apparatus of claim 11, the processor further to bias the rating value of individual user ratings by a predetermined factor before generating the first object user similarity value and the second object user similarity value.

13. The apparatus of claim 11, the memory further to store a library of media objects including the seed media object, the first media object and the second media object, the communications module further to receive the user ratings from users accessing the library of media objects, and the memory further to store the user ratings.

14. The apparatus of claim 11, the communications module further to transmit a response identifying one of the first media object and the second media object identified in the identifying operation as a media object that is more similar to the seed media object.

15. The apparatus of claim 11, the processor to identifying the seed set, the first set and the second set at least in part by:
identifying as the seed set user ratings associated with the seed media object contained in the memory;
identifying as the first set user ratings associated with the first media object contained in the memory; and
identifying as the second set user ratings associated with the second media object contained in the memory.

16. The apparatus of claim 11, the processor further to identify the seed set, the first set and the second set at least in part by:
identifying a subset of user identifiers as super-users;
identifying as the seed set user ratings associated with the seed media object and a super-user contained in the memory;
identifying as the first set user ratings associated with the first media object and a super-user contained in the memory; and
identifying as the second set user ratings associated with the second media object and a super-user contained in the memory.

17. The apparatus of claim 11, the processor to generate the first and second object user similarity values at least in part by:
for respective user identifiers having a user rating for the seed set of user ratings and the first set of user ratings, multiplying a rating value of the seed media object with a rating value of the first media object; and
for respective user identifiers having a user rating for the seed set of user ratings and the second set of user ratings, multiplying a rating value of the seed media object with a rating value of the second media object.

18. The apparatus of claim 17, the processor to calculate the first and second object total similarity values at least in part by:
adding the generated first object user similarity values to obtain the first object total similarity value; and
adding the generated second object user similarity values to obtain the second object total similarity value.

19. The apparatus of claim 11, the processor to generate the first and second object user similarity values at least in part by:
for individual user identifiers having a user rating for the seed set of user ratings and the first set of user ratings, generating a first object user similarity value by subtracting the rating value of the first media object with the rating value of the seed media object; and
for individual user identifiers having a user rating for the seed set of user ratings and the second set of user ratings, generating a second object user similarity value by subtracting the rating value of the second media object with the rating value of the seed media object.

20. The apparatus of claim 19, the processor to calculate the first and second object total similarity values at least in part by:
squaring respective generated first object user similarity values to obtain a set of squared first object user similarity values;
adding respective squared first object user similarity values to obtain the first object total similarity value;
squaring respective generated second object user similarity values to obtain a set of squared second object user similarity values; and
adding respective squared second object user similarity values to obtain the second object total similarity value.

21. An article, comprising: a non-transitory storage medium having stored thereon instructions executable by a computing device to:
store in a memory of the computing device a plurality of user ratings of respective media objects including a seed media object, a first media object and a second media object, wherein individual user ratings comprise a rating value associated with a user identifier and a media object, the individual user ratings corresponding to a user and based at least in part on input supplied by the user;
receive a user-anonymous request for a media object that is similar to the seed media object; and
identify one of a first media object and a second media object as more similar to the seed media object using the user ratings at least in part by:
identifying a seed set of user ratings associated with the seed media object, a first set of user ratings associated with the first media object and a second set of user ratings associated with the second media object,
for respective user identifiers appearing in user ratings in both the seed set and the first set, generating a first object user similarity value based at least in part on the rating values of the user ratings of the seed media object and the first media object,
calculating a first media object total similarity value based on the generated first object user similarity values,
for respective user identifiers appearing in user ratings in both the seed set and the second set, generating a second object user similarity value based on the rating values of the user ratings of the seed media object and the second media object,
calculating a second media object total similarity value based at least in part on the generated second object user similarity values, and
comparing the first media object total similarity value with the second media object total similarity value, wherein the comparing comprises characterizing the first media object and the second media object individually as vectors having a plurality of dimensions and magnitudes, wherein individual vectors of the first and second media objects comprise a plurality of magnitudes individually associated with a different dimension in multi-dimensional space, wherein individual dimensions correspond to a respective user identifier and individual magnitudes correspond to a rating value assigned to a respective media object by a user corresponding to the user identifier.

22. The article of claim 21, the storage medium having stored thereon further instructions executable by the computing device to bias the rating value of individual user ratings by a predetermined factor before generating the first object user similarity value and the second object user similarity value.

23. The article of claim 21, the storage medium having stored thereon further instructions executable by the computing device to store in the memory a library of media objects including the seed media object, the first media object and the second media object, the storage medium having stored thereon further instructions executable by the computing device to receive the user ratings from users accessing the library of media objects.

24. The article of claim 21, the storage medium having stored thereon further instructions executable by the computing device to transmit a response identifying one of the first media object and the second media object identified in the identifying operation as a media object that is more similar to the seed media object.

25. The article of claim 21, the storage medium having stored thereon further instructions executable by the computing device to identify the seed set, the first set and the second set at least in part by:
   identifying as the seed set user ratings associated with the seed media object contained in the memory;
   identifying as the first set user ratings associated with the first media object contained in the memory; and
   identifying as the second set user ratings associated with the second media object contained in the memory.

26. The article of claim 21, the storage medium having stored thereon further instructions executable by the computing device identify the seed set, the first set and the second set at least in part by:
   identifying a subset of user identifiers as super-users;
   identifying as the seed set user ratings associated with the seed media object and a super-user contained in the memory;
   identifying as the first set user ratings associated with the first media object and a super-user contained in the memory; and
   identifying as the second set user ratings associated with the second media object and a super-user contained in the memory.

27. The article of claim 21, the storage medium having stored thereon further instructions executable by the computing device to generate the first and second object user similarity values at least in part by:
   for respective user identifiers having a user rating for the seed set of user ratings and the first set of user ratings, multiplying a rating value of the seed media object with a rating value of the first media object; and
   for respective user identifiers having a user rating for the seed set of user ratings and the second set of user ratings, multiplying a rating value of the seed media object with a rating value of the second media object.

28. The article of claim 27, the storage medium having stored thereon further instructions executable by the computing device to calculate the first and second object total similarity values at least in part by:
   adding the generated first object user similarity values to obtain the first object total similarity value; and
   adding the generated second object user similarity values to obtain the second object total similarity value.

29. The article of claim 21, the storage medium having stored thereon further instructions executable by the computing device to generate the first and second object user similarity values at least in part by:
   for individual user identifiers having a user rating for the seed set of user ratings and the first set of user ratings, generating a first object user similarity value by subtracting the rating value of the first media object with the rating value of the seed media object; and
   for individual user identifiers having a user rating for the seed set of user ratings and the second set of user ratings, generating a second object user similarity value by subtracting the rating value of the second media object with the rating value of the seed media object.

30. The article of claim 29, the storage medium having stored thereon further instructions executable by the computing device to calculate the first and second object total similarity values at least in part by:
   squaring respective generated first object user similarity values to obtain a set of squared first object user similarity values;
   adding respective squared first object user similarity values to obtain the first object total similarity value;
   squaring respective generated second object user similarity values to obtain a set of squared second object user similarity values; and
   adding respective squared second object user similarity values to obtain the second object total similarity value.

* * * * *